Patented Aug. 21, 1923.

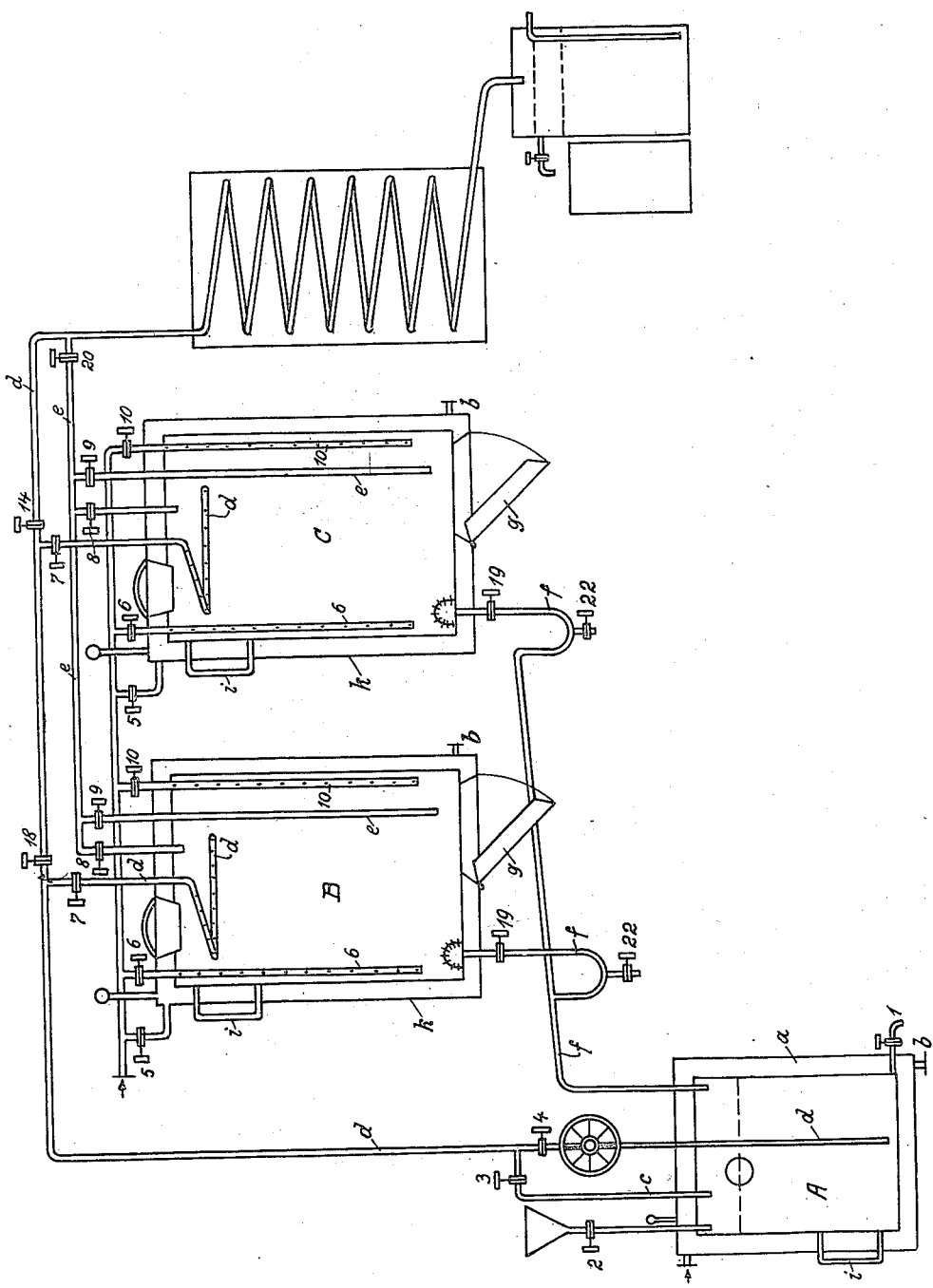

1,465,565

UNITED STATES PATENT OFFICE.

EDWARD SCHELLER, OF STOLP-ON-THE-POM, GERMANY, ASSIGNOR TO ALBERT LUCK, OF SLASSFURT-LEOPOLDSHALL, GERMANY, A FIRM.

PROCESS FOR EXTRACTING RESIN FROM WOOD WITH THE AID OF OIL OF TURPENTINE.

Application filed March 9, 1920. Serial No. 364,582.

*To all whom it may concern:*

Be it known that I, EDWARD SCHELLER, a citizen of the German Republic, residing at Stolp-on-the-Pom, German Republic, have invented certain new and useful Improvements in Processes for Extracting Resin from Wood with the Aid of Oil of Turpentine, of which the following is a specification.

This invention relates to an improved process and means for extracting the resin from the wood of conifers with the aid of oil of turpentine. It is generally known to use the oil of turpentine as a means for extracting the resin from wood, but a thorough extraction of the resin has been hitherto very difficult or almost impossible. There have been proposed various complicated methods of procedure in order to obtain a thorough extraction; it has for example been proposed to submit the wood to a vacuum and then to effect the extraction under pressure, under heat and through injecting heated air under pressure in order to complete the action of the oil of turpentine.

This invention has for its object to simplify such methods and consequently the means or apparatus for carrying out the process whereby less work is required, and the cost of installation as well as the working expenses are considerably reduced as neither pressure nor vacuum are required.

The invention is based upon the idea of using a temperature of from 140 to 150° during the time the wood is being submitted to the action of the oil of turpentine. At this temperature all the water contained in the wood is expelled from the wood as steam so that the oil of turpentine can penetrate into the smallest pores of the wood and dissolve the resin. Consequently it is no longer necessary to cut the wood into small pieces, as it had to be done with the known extracting methods.

The improved process is as follows:—

The wood cut into rather large pieces or blocks is brought into a double-walled receptacle whereupon it is overfloated with oil of turpentine which comes from a reservoir in which the oil has been previously heated to 140° C. The double walled receptacle is heated also to 140–150° C. The water contained in the wood is thus rapidly expelled as steam which steam escapes into the condenser in taking along part of the oil of turpentine. The steam is condensed in the condenser and the oil of turpentine separated from the water is retained in the reservoir. After the water has been expelled from the wood the oil of turpentine can penetrate easily into even the finest pores of the wood and extract the resin. The oil of turpentine saturated with resin flows back from the double-walled receptacle into the reservoir. This overfloating of the wood by oil of turpentine from the reservoir is continued until all the resin has been extracted from the wood and the oil of turpentine is used repeatedly until its specific gravity has no longer increased when the oil returns from the double-walled receptacle.

The solution of resin in oil of turpentine is now heated in the reservoir up to the boiling point and the oil vapour is used again in the double-walled receptacle after having been condensed. The temperature of the condensed oil vapour has to be brought to 140° C. before it is admitted into the receptacle. This treatment of the wood by oil of turpentine is repeated until there is no longer any resin in the wood, whereupon the oil of turpentine is driven out of the wood with the aid of steam.

The oil of turpentine is separated from the solution contained in the reservoir and the residues can be utilized as raw colophony.

An apparatus for carrying out the improved process is shown in the accompanying drawing by way of example.

The vessel A contains the oil of turpentine, the receptacles B and C are filled with roughly cut wood. To start the extraction so much oil of turpentine is pumped into the receptacle B until the same is nearly filled. Valves 4 and 7 in the supply pipes for receptacles B, C and the valves 8 and 20 in the steam pipes leading from the said receptacles are closed, the air valve 2 of the oil vessel A being opened sufficiently to admit the amount of air which is required for pressing the oil into receptacle B. All the other valves of the plant are closed.

After the valve 7 has been closed, steam is admitted into the steam jacket K, in order to heat the contents of receptacle B up to 140–150°. The water which is thus driven out of the wood escapes as steam with part of the oil of turpentine through the outlet pipe e into the condenser. The wood is thoroughly impregnated with oil of turpentine and the resin is thus extracted for the largest part. The valve 2 is closed and the valve 19 in the outlet pipe $f$ at the bottom of vessel B is opened. The oil of turpentine with the extracted resin flows back into the vessel A which has—in the meantime—been heated up to 140-150°. The pumping of oil of turpentine into receptacle B is repeated several times until the specific gravity does not increase any more which can be ascertained by drawing off a specimen of the oil through the cock 22. After the valves 3, 7 and 9 have been opened, and valves 4 and 8 closed, steam is admitted into the steam jacket $a$ of vessel A in order to heat the oil of turpentine to the boiling point so that it flows through the feeding pipes $c$, $d$ into the receptacle B. The oil vapor has to arrive in the said receptacle B at a condensed state and cooled to about 150°. If this cannot be attained without special auxiliary devices, a retarding device must be arranged before the valve 7 of receptacle B, in order to prevent the carbonization of the wood. The oil of turpentine flows over the wood and out of the receptacle B through the outlet pipe $f$ which leads the oil back to the vessel A. Remainders of water vapor admixed with oil of turpentine pass through pipe $e$ into the condenser. After a treatment during several hours all the resin has been extracted from the wood and a specimen taken at cock 22 shows that the oil is colourless. The steam is shut off from jacket $a$, valves 7 and 19 are closed and the valves 13 and 14 are opened to let off any excessive pressure which should still exist. The wood in receptacle B contains only pure oil of turpentine which is expelled by means of steam, and flows out through the escape pipe $e$ after the valves 6 and 19 have been opened. The extraction in B is finished and the wood in receptacle C can now be treated in the same manner as just described. After the receptacle B has been cooled it is emptied through the outlet $g$.

If the oil of turpentine in the vessel A is sufficiently saturated with resin the oil is distilled through the conduit pipes $c$, $d$ after the corresponding valves have been opened and the residues consisting of raw colophony are let off through cock 1.

I claim:—

An improved cyclic process of extracting resin from wood through extraction with oil of turpentine consisting in heating up to 140-150° C. the contents of a double-walled receptacle filled with wood pieces and with oil of turpentine allowing vapors of steam carrying some of the oil to escape, the remaining oil penetrating into the pores of the wood to dissolve the resin, permitting oil saturated with resin to flow back to an oil reservoir where it is heated to 140° C. and conducting it back to the double-walled receptacle, this procedure being repeated until the specific gravity of the oil saturated with resin does not increase any more, driving oil of turpentine out of the wood by means of steam, separating oil of turpentine saturated with resin contained in the oil reservoir into oil and resin.

In testimony whereof I affix my signature in presence of two witnesses.

Dr. EDWARD SCHELLER.

Witnesses:
 Louis Dobenzig,
 Otto Haase.